US011473916B1

(12) United States Patent
Mao (10) Patent No.: US 11,473,916 B1
(45) Date of Patent: Oct. 18, 2022

(54) ROPE-BASED INDOOR INFRASTRUCTURE FREE LOCALIZATION

(71) Applicant: RHUB Communications, Inc., San Jose, CA (US)

(72) Inventor: Chengjiang Mao, San Jose, CA (US)

(73) Assignee: RHUB Communications, Inc., San Jose, CA (US)

( * ) Notice: Subject to any disclaimer, the term of this patent is extended or adjusted under 35 U.S.C. 154(b) by 277 days.

(21) Appl. No.: 17/002,640

(22) Filed: Aug. 25, 2020

Related U.S. Application Data

(60) Provisional application No. 62/922,725, filed on Aug. 26, 2019.

(51) Int. Cl.
*G01C 21/20* (2006.01)
*G06K 19/07* (2006.01)

(52) U.S. Cl.
CPC ....... *G01C 21/206* (2013.01); *G06K 19/0723* (2013.01)

(58) Field of Classification Search
CPC .................................. G06K 19/0723
USPC ....................................... 701/517
See application file for complete search history.

(56) References Cited

U.S. PATENT DOCUMENTS

| | | | | |
|---|---|---|---|---|
| 2009/0014242 | A1* | 1/2009 | Tang | H04Q 9/00 182/241 |
| 2009/0183945 | A1* | 7/2009 | McLoughlin | A62B 3/00 182/100 |
| 2014/0159872 | A1* | 6/2014 | Bekritsky | G06K 7/10079 340/10.5 |
| 2015/0108210 | A1* | 4/2015 | Zhou | G01S 5/0247 235/375 |
| 2021/0277598 | A1* | 9/2021 | Correia | B66D 1/50 |

* cited by examiner

*Primary Examiner* — Michael G Lee
*Assistant Examiner* — David Tardif
(74) *Attorney, Agent, or Firm* — Miller IP Law LLC (57) ABSTRACT

Some embodiments describe a system for rope-based localization. The system includes a rope; a first tag, and a second tag coupled to the rope at an interval from the first tag. A reader includes a reader tag sensor to detect the first tag and record a rope ID or a tag ID. The rope ID includes identifying information for the rope. The tag ID includes identifying information for first tag. An orientation measurement unit records orientation data for the reader. The reader is aligned with the rope. The reader orientation is taken as the rope orientation. The orientation data includes azimuth measurement and attitude measurement of the reader. A navigation device includes a navigation tag sensor to detect the first tag and a navigation processor to receive positioning data of the first tag.

20 Claims, 9 Drawing Sheets

ROPE-BASED INDOOR INFRASTRUCTURE FREE LOCALIZATION

CROSS-REFERENCE TO RELATED APPLICATIONS

The present application claims the priority of U.S. Provisional Patent Application No. 62/922,725, filed on 26 Aug. 2019. The entire contents of the above-listed application are hereby incorporated by reference for all purposes.

BACKGROUND

Location identification for areas in which GPS (Global Positioning Satellite) signal is weak or otherwise insufficient is difficult. This is particularly challenging for indoor tracking as buildings add both hinderance for GPS signal and introduce considerable complexity to tracking as multiple floors and rooms are involved.

This can be a particular challenge in emergency situations where time to identify a location of a person is critical to preventing harm or even saving a life. For structure fires or other rescue situations, quickly locating victims and troubled responders in real-time is of utmost importance. GPS signal is generally not available inside most buildings and any existing infrastructure in a building that is intended to provide indoor positioning usually cannot be relied on due to damage to the structure and the indoor positioning infrastructure.

BRIEF DESCRIPTION OF DRAWINGS

The present description will be understood more fully when viewed in conjunction with the accompanying drawings of various examples of rope-based indoor-free localization such as RFID (radio-frequency identification) based localization. The description is not meant to limit the rope-based indoor infrastructure-free localization to the specific examples. Rather, the specific examples depicted and described are provided for explanation and understanding of rope-based indoor infrastructure-free localization. Throughout the description, the drawings may be referred to as drawings, figures, and/or FIGs.

DETAILED DESCRIPTION

An apparatus, system, and/or method for rope-based localization, as disclosed herein, will become better understood through a review of the following detailed description in conjunction with the figures. The detailed description and figures provide merely examples of the various embodiments of rope-based localization. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional rescue ropes include a heat-resistant rope having knots to indicate rope length and rope direction. While, this system provides assistance by allowing a rescue team to follow a path to locate, and attempt to provide assistance or aid to, a user of the rescue rope or for rescuers to locate exits, it does not provide accurate localization and is susceptible to compromise due to change in the path such as structural failure (e.g. collapse, impassable door, etc.) or environmental change (e.g. fire shift, water flooding, etc.). Because the conventional rescue rope system does not provide robust localization, it can put rescuers at greater risk.

Embodiments disclosed herein provide more accurate localization of rescuers inside a structure or other closed environment where a GPS signal is insufficient and where either no localization infrastructure is available, or the available localization infrastructure is compromised. The accurate localization allows for more effective tracking of rescuers or other responders. More accurate tracking facilitates a faster response time for rescuers and more effective rescue rate for troubled individuals including rescuers. Examples below refer to firefighters but other tracking for divers, searchers, law enforcement, first responders, and so forth are also contemplated.

Figure 1:
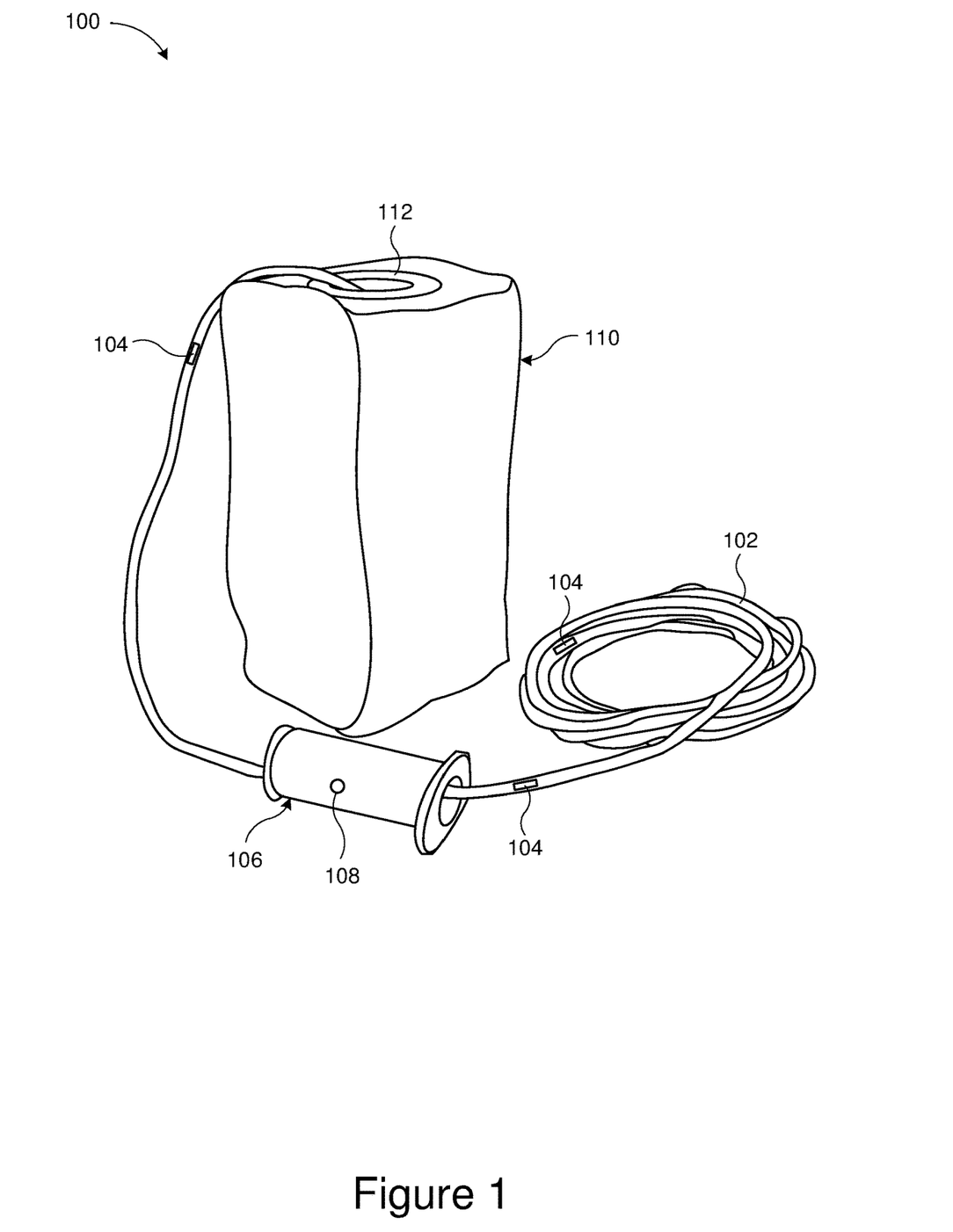
FIG. 1 illustrates a perspective view of an apparatus for rope-based localization, according to an embodiment.

FIG. 1 illustrates a perspective view of an apparatus 100 for rope-based localization, according to an embodiment. The apparatus 100 may allow a rescuer, such as a firefighter, to move into a building or other structure and create a pathway to follow in order to exit and a digital pathway and localization for others to reach the rescuer should the rescuer become troubled.

In the illustrated embodiment, the apparatus 100 includes a rope 102, a tag 104, and a reader 106. The term "rope" is used to refer to any flexible element that can be laid out along a path of travel and carry tag 104. The rope 102 may be carried in a container 110 and arranged to pass through an opening 112 in the container 110 to facilitate placement of the rope 102 during an operation. The rope 102 extends through the reader 106. The container 110 may be a pack, bag, or other portable unit. The apparatus 100 may also omit the container 110.

Figure 2:
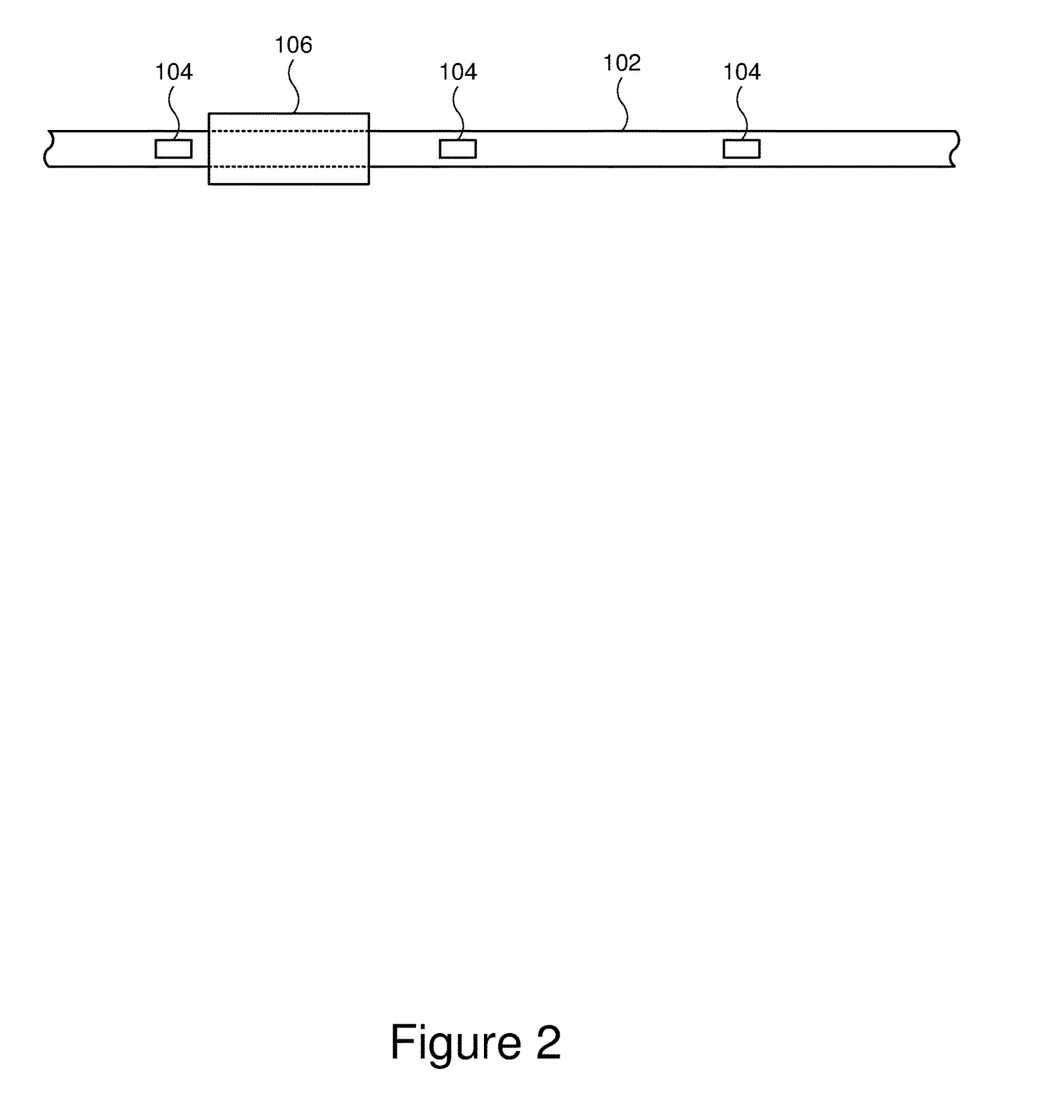
FIG. 2 illustrates a schematic view of the tag rope of FIG. 1, according to an embodiment.

In the illustrated embodiment, the tags 104 are coupled to the rope 102 with the tags 104 positioned at a pre-defined interval along a length of the rope 102. Each of the tags 104 may be positioned at equal intervals along the rope 102 or may be positioned at different intervals along the rope 102 which may form a pattern. FIG. 2 illustrates a schematic view of the tag rope of FIG. 1, according to an embodiment. Because the reader 106 can pass easily over the tags 104, the rescuer may place the rope 102 without hinderance or undue difficulty or complexity.

One or more of the tags 104 may be passive or active elements. In some embodiments, the tags 104 are passive or active radio-frequency ID tags (RFID tags) or other passive or active tags such as BLUETOOTH® tags and so forth. One or more of the tags 104 may be coupled to the rope 102 by embedding the tags 104 to be within an interior of the rope 102. In other embodiments, one or more of the tags 104 may be coupled to the rope 102 by bonding, adhering, or otherwise attaching the tags 104 to an exterior of the rope 102. The rope 102 may include materials, coatings, and/or treatments which provide beneficial attributes such as fire-resistance, abrasion resistance, tensile strength, grip, visibility, and so forth. The rope 102 may have a circular cross-sectional geometry. Alternatively, the rope 102 may have some non-circular cross-section. One or more of the tags 104 may be embedded within a core of the rope 102 or in an outer sheath or layer of the rope 102 to protect the tags 104 from environmental damages sources such as heat, abrasion, impact, and so forth. Alternatively, one or more of the tags 104 may be disposed on or in an exterior coating or layer applied to the rope 102.

The reader 106 is positioned to allow the rope 102 to pass by the reader 106 and detect each of the tags 104 coupled to the rope 102 as the reader 106 comes into proximity or communication range of each of the tags 104. The reader 106 may be configured to record identification data from each of the tags 104 and record orientation data based on an orientation of the reader 106, which is taken as the rope orientation.

In some embodiments, the reader 106 may be arranged as a hollow cylinder configured to allow the rope 102 to pass through a center of the reader 106. The cylindrical arrangement may allow the rope 102 to pass through a center of the reader 106 while providing a handgrip for a user which reduces potential interference with passage of the rope 102. Different sensors (active, passive, RFID, etc.) may facilitate placement and different locations relative to the rope 102.

In some embodiments, the reader 106 includes an activation interface 108. The activation interface 108 may take the form of a tactile button, a touch-sensitive element, a switch, a dial, and so forth. To reduce human interference over the reader 106 when measuring the rope orientation, a wireless controller such as a Bluetooth based device may be used to control the interface 108. The activation interface 108 engages, disengages, or otherwise affects an operational state of the reader. The reader 106 may include one or more power ports, battery doors, data connections, or other interfaces or structures.

The identification data, detected by the reader 106 from each of the tags 104, may include a rope ID corresponding to the rope 102. The rope ID may specify a particular interval or physical spacing between the tags 104 or pattern of intervals between the tags 104. The identification data may also include a total number of tags 104 in the rope 102. The identification data may also include tag ID information. The tag ID information may include information unique to each tag 104. In some embodiments, the tag ID is sequential for each tag 104 along a length of the rope 102. For example, each tag ID in a rope may start with a "0" for a first one of the tags 104 and so forth. The tag ID may also indicate how many tags 104 are implemented in the length of the rope 102. By reading a tag ID, the reader 106 can determine the current position of the reader 106 along the length of a rope.

The apparatus 100 may be engaged by anchoring a first end of the rope 102 to a surface or structure at a start location. In some embodiments, the surface or structure to which the rope 102 is anchored as a start location has a known geolocation, for example, by using GPS data. The rope 102 may be anchored at various points along the length of the rope 102. The reader 106 includes an orientation measurement unit (OMU) to detect orientation of the reader 106, which is taken as the rope orientation. In order to make the rope orientation measurement accurate, the rope should be stretched, and rope looseness needs to be avoided whenever the rope is anchored. The rope 102 runs through the reader 106 which detects and records the passage of the tags 104. This, in conjunction with orientation data recorded by the reader 106 can be used to generate a digital pathway for the user by calculating the positioning of each tag that has passed through and the positioning of each anchor that has been placed. Additionally, other ropes 102 may be coupled to the rope 102 to allow for one or more other paths to connect to the generated digital pathway.

An anchor may be placed to facilitate attachment to secure an end of the rope 102. Anchors may also be placed along the length of the rope 102 to secure the rope 102 and at changes in the trajectory or path of the rope 102. For example, if a responder enters a building and turns around a corner, an anchor may be placed and the rope 102 secured to the anchor at the corner. The anchor may secure the rope 102 to a surface. In some embodiments, the anchors used to secure the rope 102 include at least one of nails, spikes, screws, clips, carabiners, hooks, glue, and so forth. When an anchor is placed, it triggers the reader 106 to record at the anchor point the current rope orientation and the distance between this anchor and the previous anchor. The information is used to calculate the positions of all tags and anchors that have passed and created so far.

An anchor can be placed between two tags. In one embodiment, the distance between the anchor and the two tags are measured by the received signal strength indicator (RSSI) detected by the reader 106 from the front tag and back tag. A lookup table of RSSI vs distance can be used to measure the distances.

Figure 3:
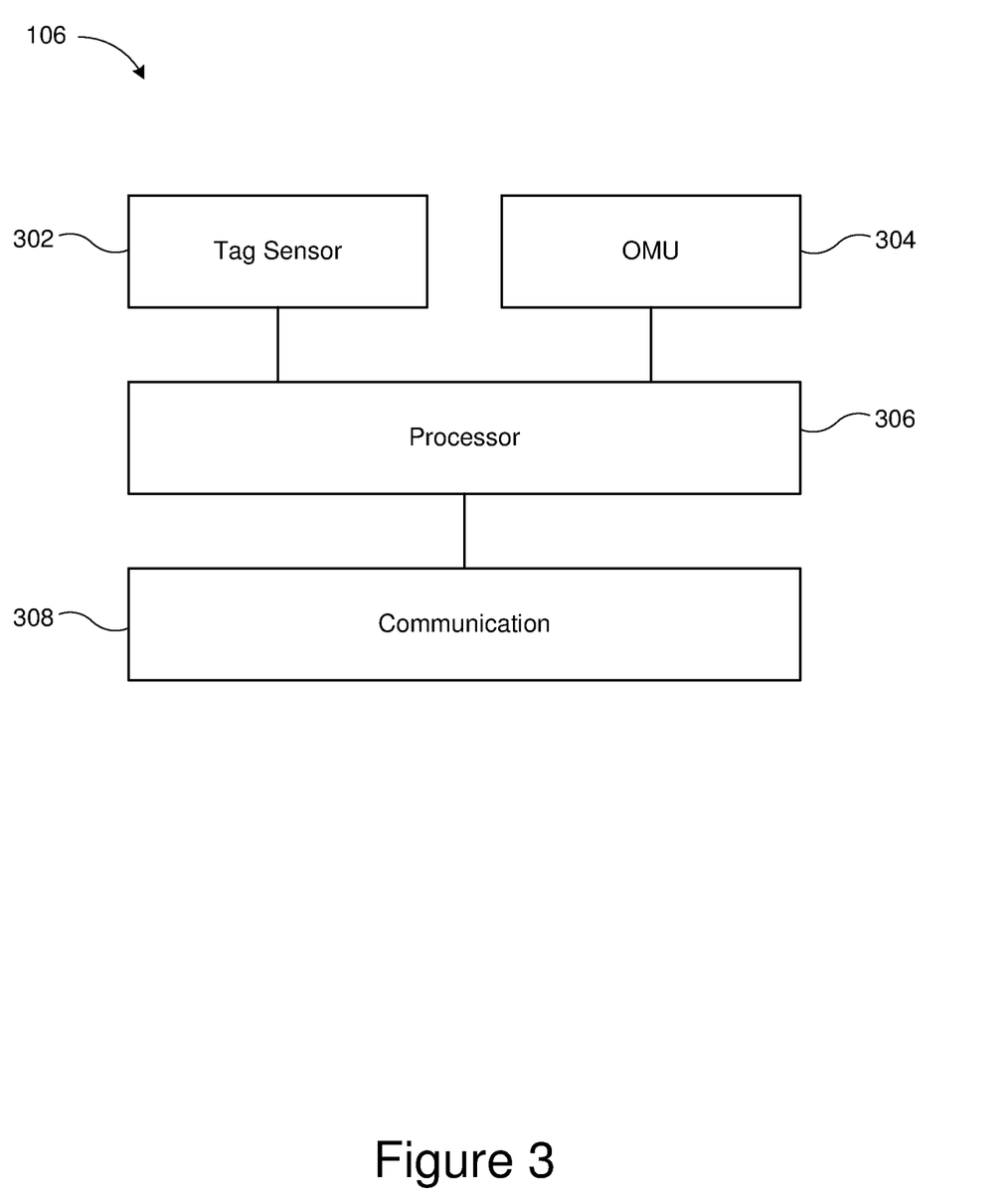
FIG. 3 illustrates a block diagram of the reader of FIG. 1, according to an embodiment.

FIG. 3 illustrates a block diagram of the reader 106 of FIG. 1, according to an embodiment. The reader 106 provides a compact package for tag detection and orientation measurement. The reader 106 is aligned with the rope 102 so that the orientation of the reader 106 is equal to the orientation of the rope 102. In order to ensure the alignment of the reader with the rope, the rope 102 between two anchors needs to be straight.

In some embodiments, the reader 106 may include a tag sensor 302, an orientation measurement unit (OMU) 304, a processor 306, and a communication module 308. The tag sensor 302 may be configured to detect and read information from tags 104 as they pass the reader 106. In some embodiments, the tag sensor 302 provides an activation signal to energize a passive tag 104 and detects the response from the passive tag 104. In other embodiments, the tag sensor 302 detects an active tag 104 and reads information from the active tag 104. The active tag 104 may have access to a tag-local power source to provide information to the reader 106 without requiring an energizing signal from the reader 106. Information detected by the tag sensor 302 is communicated to the processor 306.

In one embodiment, the tag sensor 302 is a RFID reader. In another embodiment, it can be a Bluetooth receiver. It depends the tag implementation.

In some embodiment, the OMU 304 is an inertial measurement unit. In another embodiment, the OMU can be a sensor detecting the angle of the received radio signals from a tag of the rope 102.

The OMU 304 of the reader 106 measures an orientation of the reader 106, which is taken as the orientation of the rope 102. The OMU 304 sends the orientation information to the processor 306.

In some embodiments, the reader 106 includes an on-board battery. In other embodiments, the reader 106 is coupled to a separate power source. For example, the reader 106 may be coupled to a power source located in the container 110 or another part of the personal gear of a user. The power source for the reader 106 may be dedicated to the reader 106 alone or may supply power to one or more other devices or systems.

In some embodiment, the reader 106 records audio, video or photo cues to assist navigation or pay special attention to immediate hazard. For example, the reader 106 may record an audio message "After exiting this door, the next is a hallway. Make a left turn and follow the hallway". The audio message is associated with the tag where the audio message is recorded. When a user passes by this tag, the audio message replays.

The processor 306 receives the information from the tag sensor 302 and the OMU 304. It may interpret the information to generate the digital pathway. The processor 106 may also provide the digital pathway information to the communication module 308 for sending to a receiver such as a coordination display on a mobile response vehicle, an associated server, other user's equipment, and so forth. Alternatively, the processor 306 may compile the information without determining the digital pathway but provides the information to the communication module 308 and cause the communication module 308 to relay the information to a receiver for further processing to determine the digital pathway. The communication module 308 can also broadcast the positioning information to all devices in a network without going through a central server.

In some embodiments, the reader 106 may include an alignment aid which assists the user in aligning the reader 106 with orienting the reader 106 for proper OMU detection. For example, the reader 106 may include a laser or other light source, a pointing structure such as a rod, and so forth.

Figure 4:
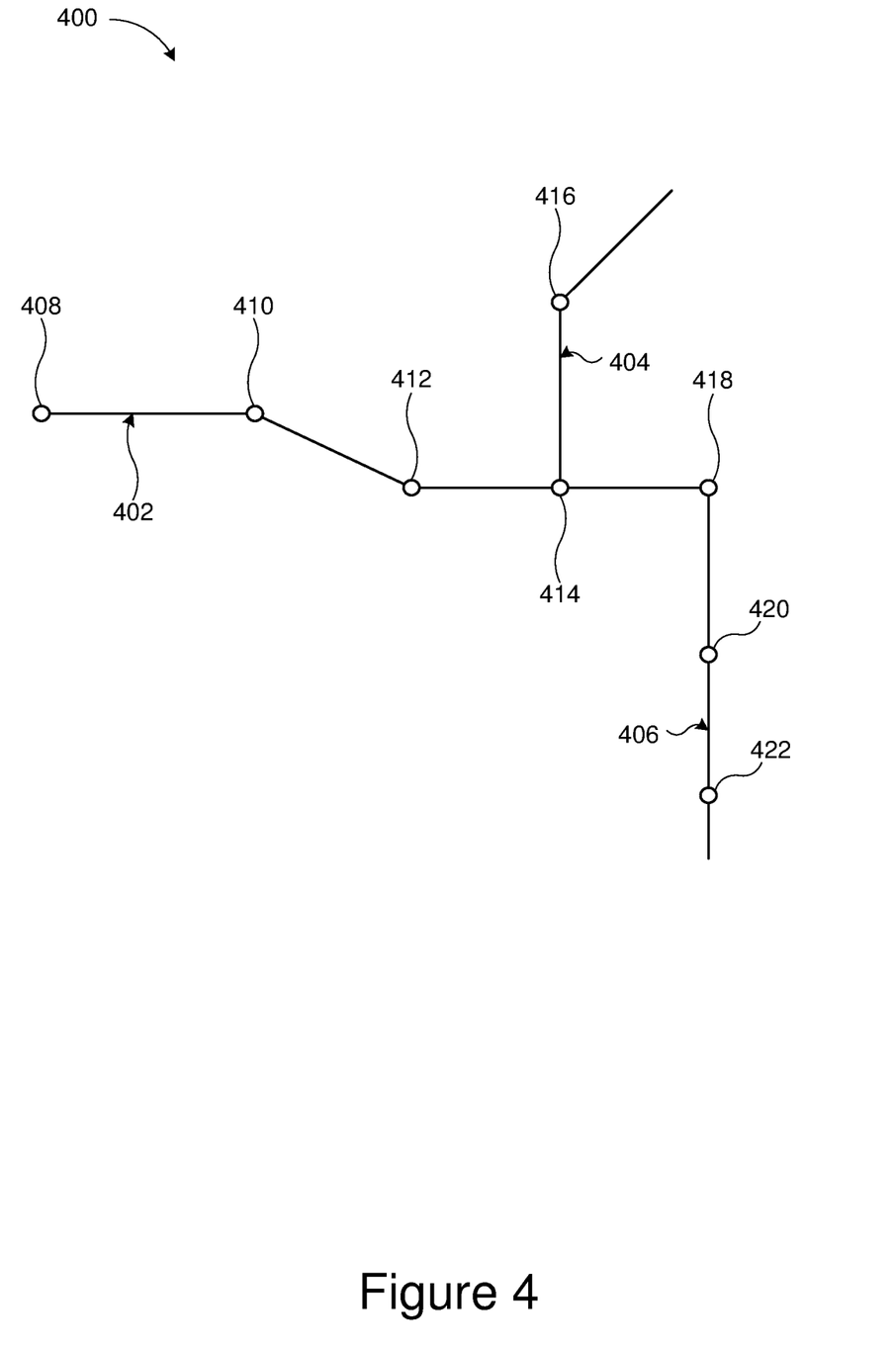
FIG. 4 illustrates an overhead view of a digital pathway for multiple ropes, according to an embodiment.

FIG. 4 illustrates an overhead view of one embodiment of a digital pathway 400 for multiple ropes 402, 404, and 406, according to an embodiment.

In the illustrated embodiment, a first rope 402 is anchored at a start anchor 408. The GPS or other location information for the start anchor 408 may be known. The first rope 402 has a change in trajectory or path at a second or intermediate anchor 410. At the second anchor 410, the user places the second anchor 410, secures the first rope 402, orients the reader 106, and initiates an orientation measurement with OMU of the reader 106. The reader 106 records the direction of the first rope 402 at the second anchor 410. At the third anchor 412, the reader 106 detects another direction change. A branch anchor 414 may be placed at which the second rope 404 is connected to the first rope 402. The branch anchor 414 acts as both an intermediate anchor for the first rope 402 and a first anchor for the second rope 404. The branch anchor 414 allows a team of rescuers to split up to search an area more effectively without needing to each carry a dedicated rope 102 into the area from the beginning.

To set the branch anchor 414, a first rescuer carrying the first rope 402 may place an anchor and continue with the first rope 402 in a direction measured by the reader 106 of the first rescuer (in the illustrated embodiment, this direction is towards end anchor 418) and a second rescuer attaches the second rope 404 to the branch anchor 414 and similarly sets a direction using another reader 106 arranged on the second rope 404 and oriented in a direction of intended travel for the second rescuer. The second rescuer initiates a heading measurement with the corresponding reader 106 and proceeds to advance the second rope 404 with the ability to place corresponding anchors 416.

At the end of the first rope 402, an end anchor 418 may be placed. The first rescuer may place the end anchor 418 and attaches the third rope 406. The first rescuer is then able to continue forward and set intermediate anchors 420 and 422 associated with the third rope 406. The tracking information for both the second rope 404 and the third rope 406 is associated with the tracking information of the first rope 402 to form a complete digital pathway for multiple ropes and rescuers.

Figure 5:
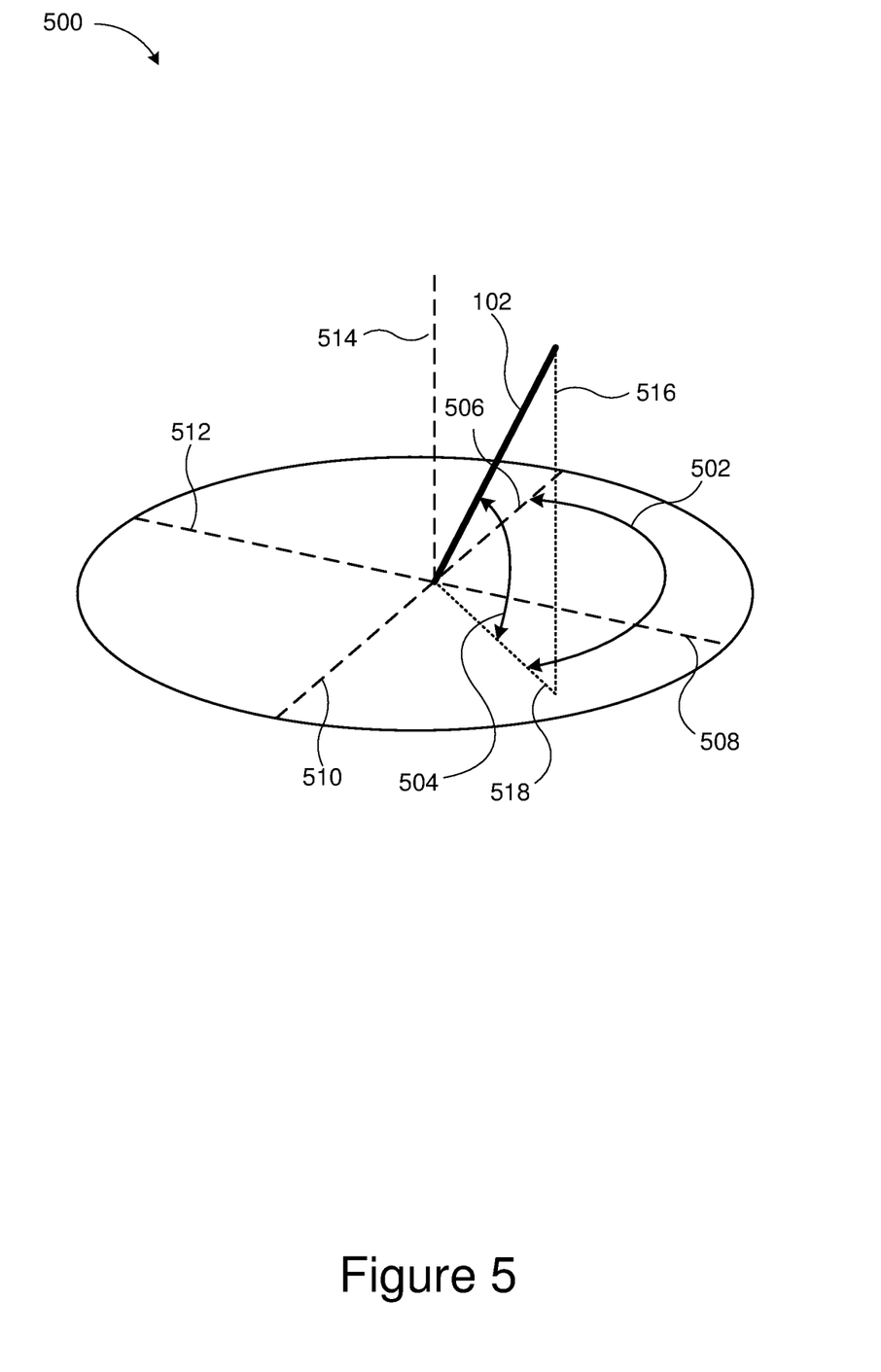
FIG. 5 illustrates an angle diagram, according to an embodiment.

FIG. 5 illustrates an angle diagram 500, according to an embodiment. The angle diagram 500 illustrates the ability of the system disclosed herein to track the apparatus 100 through three-dimensions of space which facilitates tracking of the apparatus 100 through multiple floors/levels of a structure as well as throughout each of those floors/levels.

The angle diagram 500 shows the rope orientation information, which is measured by the reader 106. The rope 102 is shown as a heavier line extending from a center of the angle diagram 500. Azimuth measurement or azimuth angle 502 is between 0 and 360 degrees around the center of the angle diagram 500 and attitude measurement 504 is an attitude angle between 0 and 90 degrees (positive and negative) relative to the horizontal with 90-degrees aligning with vertical 514.

Azimuth angle 502 is shown as relative to a zero-azimuth line 506 pointing to the North. Reference lines of 90-degree azimuth line 508 pointing to the East, 180-degree azimuth line 510 pointing the South, and a 270-degree azimuth line 512 pointing the West are included for reference. The attitude measurement 504 extends up from (positive) or down from (negative) horizontal. The combination of azimuth angle 502 and attitude measurement 504 give a resulting horizontal distance 518 and vertical distance 516. This allows the reader 106 and associated components to track not only horizontal movement of a rescuer but also vertical movement which allows for tracking a change of floors both up and down.

Below is an example of code that may be utilized to determine positioning of tags and anchors.

Terms and conditions used in the example code may include:

The tags and anchors are sequentially indexed starting from 0. The intervals between tags are equal. Forward movement along the rope 102 leads to the increasing tag index. The front tag of an anchor is the immediate tag before reaching the anchor. The back tag of an anchor is the next immediate tag after leaving the anchor. The rope between two anchors, which is called a segment, is straight and has three dimension orientation as shown in FIG. 5. Each segment of a rope has zero or multiple tags. The segment length and orientation information, which is measured by the reader 106, is associated with the data structure of the anchor at the end of a segment. The first anchor after passing a tag is called the back anchor of the tag. Anchor[k−1] is the front anchor of Anchor[k] and Anchor[k+1] is the back anchor of Anchor[k]. The distance between tags and anchors are the rope length (line 506) between the tags and anchors. The first anchor is placed at the first tag of a rope whose geolocation is acquired by GPS outside a building or assigned with some values or inherence from another rope when this rope is attached to another rope. The flat distance is the horizontal distance (line 518) between two tags or anchors. The height gain is the vertical distance (line 516) between two tags and anchors. The flat distance is used to calculate the geological positions (latitude and longitude) of tags and anchors. The height gain is used to calculate the floor level of tags and anchors.

```
Anchor
{
int m_iFrontTagID;                          // the front tag of this anchor
double m_dDistanceFromFrontTag;             // rope length, line 506
double m_dDistanceFromBackTag;              // rope length, line 506
int m_iAzimuthAngle;                        // angle 502
int m_iAttituteAngle;                       // angle 504
double m_dDistanceFromFrontAnchor              // rope length, line 506
double m_dFlatDistanceFromFrontAnchor          // line 504
double m_dLatitude;                         // geolocation of this anchor
double m_dLongitude;                        // geolocation of this anchor
int m_iFloorLevel;                          // floor level of this anchor
int m_iHeightGain;                          // line 516
}
Tag
{
string m_sRFID;                             // written by the manufacturer of a rope
int m_iSequenceId;                          // encoded inside m_sRFID
int m_iAzimuthAngle;                        // copied from the back anchor's m_iAzimuthAngle,
int m_iAttituteAngle;                       // copied from the back anchor's m_iAttituteAngle,
int m_iFrontAnchorId;
double m_dDistanceFromFrontAnchor
double m_dFlatDistanceFromFrontAnchor
double m_dLatitude;
double m_dLongitude;
int m_iFloorLevel;                          // copied from the back anchor's m_iFloorLevel
}
Where:
constant int g_iTagInterval = 1; // the interval between two tags in feet
int k = Tag[i].m_iFrontAnchorId;
Anchor[k].m_dDistanceFromBackTag = g_iTagInterval −
    Anchor[k].m_dDistanceFromFrontTag;
int iNumberOfTagInBetween =Anchor[k + 1].m_iFrontTagID −
    Anchor[k].m_iFrontTagID;
Anchor[k + 1].m_dDistanceFromFrontAnchor = Anchor[k].m_dDistanceFromBackTag
    + (iNumberOfTagInBetween − 1) * g_iTagInterval
    + Anchor[k + 1].m_dDistanceFromFrontTag;
Tag[i].m_dDistanceFromFrontAnchor = = Anchor[k].m_dDistanceFromBackTag
    + (i − Anchor[k].m_iFrontTagID − 1) * g_iTagInterval;
Where:
Tag[i].m_dFlatDistanceFromFrontAnchor = Tag[i].m_dDistanceFromFrontAnchor *
    cos(Tag[i].m_iAttituteAngle);
Anchor[k+1].m_dFlatDistanceFromFrontAnchor =
    Anchor[k+1].m_dDistanceFromFrontAnchor *
    cos(Anchor[k+1].m_iAttituteAngle);
Anchor[k+1].m_iHeightGain = Anchor[k+1].m_dDistanceFromFrontAnchor *
    sin(Anchor[k+1].m_iAttituteAngle);
The Tag[0] m_dLatitude, Tag[0] m_dLongitude, Anchor[0] m_dLatitude, and Anchor [0] m_
dLongitude are given by GPS, assignment, or inheritance. Together with
Tag[1].m_dFlatDistanceFromFrontAnchor, Tag[1]. iAzimuthAngle,
Anchor[1].m_dFlatDistanceFromFrontAnchor, and Anchor[1]. iAzimuthAngle, there is a
geolocation formula that can come up Tag[1] m_dLatitude, Tag[1] m_dLongitude, Anchor[1]
m_dLatitude, and Anchor [1] m_dLongitude. Then repeat the process for every segment of the
rope 102 to calculate geolocation of all tags and anchors within the segment as the rope 102 is
laid. To calculate the tag and anchor floor levels, divide Tag[i].m_iHeightGain and
Anchor[k].m_iHeightGain by floor height.
```

Figure 6:
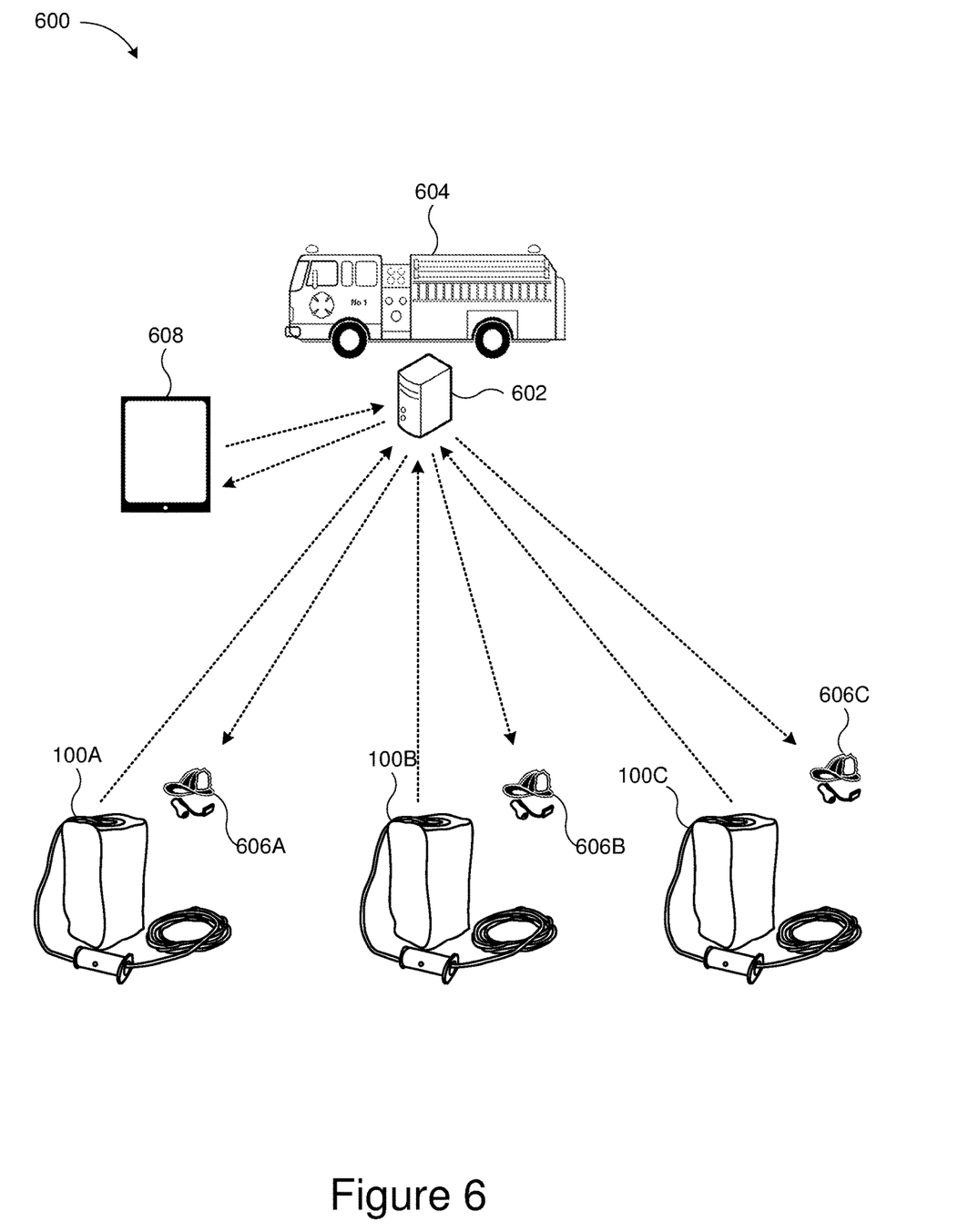
FIG. 6 illustrates a schematic view of a system for rope-based localization, according to an embodiment.

FIG. 6 illustrates a schematic view of a system 600 for rope-based localization, according to an embodiment. Embodiments of the system 600 provide localization for multiple apparatuses 100(A-C) in a centralized approach. This allows for increased safety for rescuers and improved coordination. In another embodiment, there is not a centralized server 602 and all apparatuses 100 communicate peer to peer by broadcasting positioning data to everyone in a local network.

The system 600 includes a server 602, at least one apparatus 100(A-C) for rescue ropes, and at least one navigation device 606(A-C). The server 602 is shown as being associated with a fire response vehicle 604 but may be associated with other vehicles, may be a stand-alone unit, or may be a server at a facility remote to the location of the rescue event. The system 600 is also shown with a coordination display 608, which can be a tablet.

In the illustrated embodiment, each of the apparatuses 100(A-C) communicates digital pathway information to the server 602. Communication between component of the system 600 may communicate via wired or wireless connections. In some embodiments occur wirelessly while other occur via wired connections between some elements. The server 602 provides the positioning information and other recorded cues such as an audio clip to navigation devices 606(A-C) to enable teams to locate and provide rescue or support to troubled rescuers based on the tracked location(s) of one or more troubled rescuers. In some embodiments, the navigation devices 606(A-C) are configured to provide one or more inputs to help guide a rescuer to a troubled rescuer. For example, each navigation device 606(A-C) may provide a visual map or map overlay to provide visual guidance. Audio cue and instructions may also be relayed via the navigation devices 606(A-C). Other cues, such as visual cues, tactile cues, and so forth may also be provided alone or in combination with another form of input.

The coordination display 608 may provide real-time information to a coordinator to allow the coordinator to provide instructions or notifications to rescuers to assist in reaching or otherwise supporting troubled rescuers. The coordination display 608 may provide information to the navigation devices 606(A-C) via the server 602 or, alternatively, may provide information via direct communication to the navigation devices 606(A-C).

Figure 7:
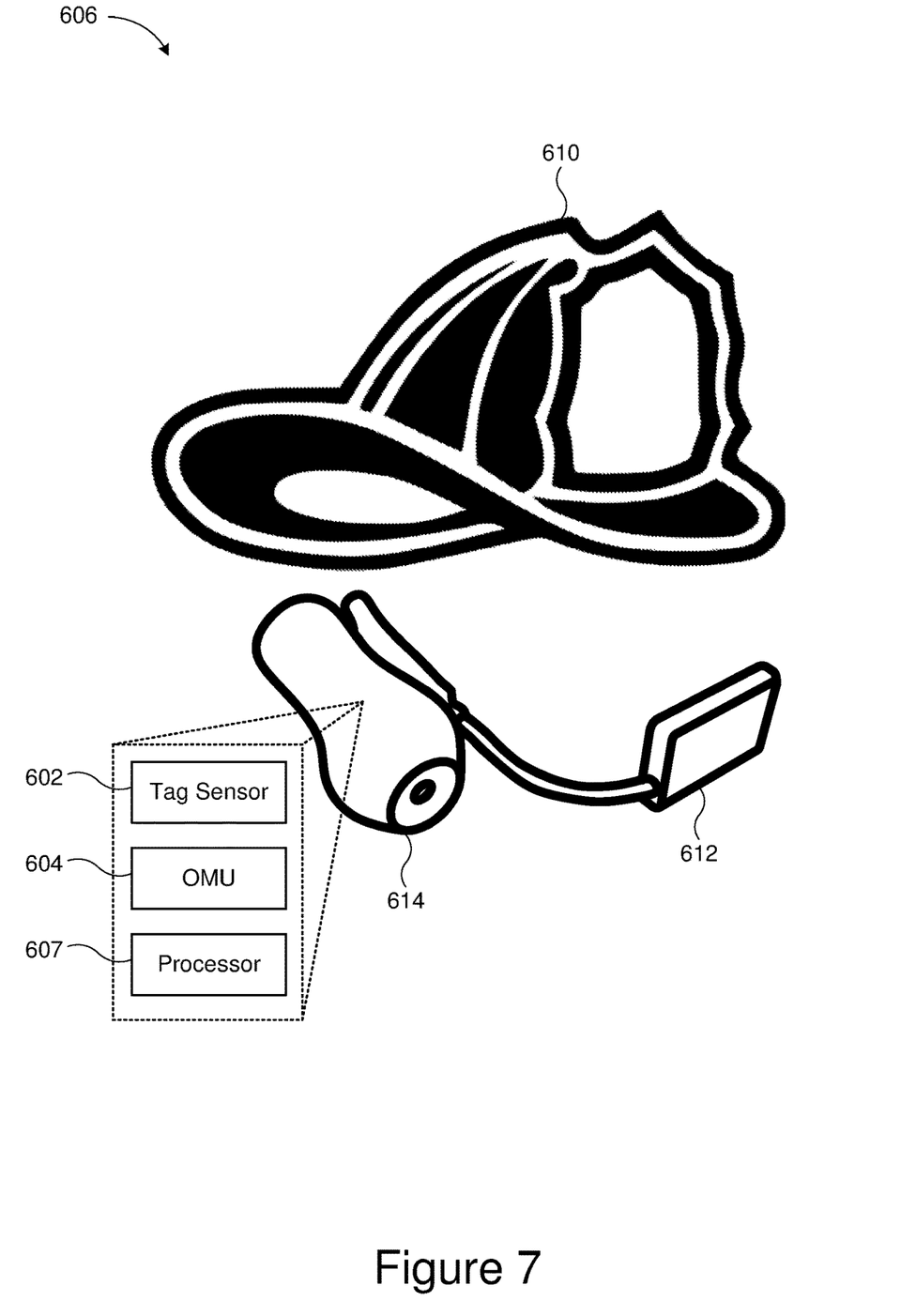
FIG. 7 illustrates a perspective view of a navigation device according to an embodiment.

FIG. 7 illustrates a perspective view of a navigation device 606 according to an embodiment. In some embodiments, the illustrated embodiment navigation device 606 is attached to a firefighter helmet 610. The navigation device 606 receives positioning data from the server 602, which is generated when the rope 102 is laid. In other embodiments, the navigation device may be coupled to another piece of gear. In some embodiments, the navigation device 606 includes a tag sensor 602, an OMU 604, a processor 607, and a display device 612. The display device 612 is configured to provide a visual indication of a position and/or orientation of the navigation device 606, a position and/or orientation of a reader 106 on the rope 102, a digital pathway representing the rope 102, or a digital pathway generated by a pedestrian dead reckoning (PDR) algorithm when the navigation device is far away from the rope 102.

The navigation device 606 may further include a camera 614. The camera 614 may be a thermal camera or other imaging camera to detect a characteristic of an environment of the navigation device 606.

In some embodiment, the tag 104 is not recorded with positioning data because the process of acquiring positioning data is purposely skipped for simplicity or cannot be implemented because the communication network or the server is out of service. Without positioning information of the tag 104, the navigation device 606 can still detect its distance from the tag 104 by the tag sensor 602 and decide when to correct the next movement in order to keep following the rope 102. For example, if the previous left turn, which is detected by the OMU 604, leads to increasing distance from the rope 102, the navigation device 606 can tell the rescuer to make slight right turn via a display or an audio speaker. Also, based on the tag 104 ID sequence (increasing or decreasing), the navigation device 606 can tell whether the rescuer moves into a building or exits the building. As the result, the navigation device 606 can guide a rescuer go along the rope 102 in a zigzag way to move into or move out a building.

In some embodiments, the navigation device 606 may be configured to implement a pedestrian dead reckoning (PDR) algorithm in response to a determination that the navigation device 606 has moved away from the rope 102. It may intake information from the OMU 604 for PDR to calculate the location of the navigation device 606 while it is away from the rope 102. PDR is especially useful when a user moves into to a small where the rope 102 is not deployed or the rope 102 is partially destroyed over the course of rescue. Once a user comes close to the tag 104, PDR will stop execution and reset to the position of Tag 104. The reset will fix the accumulated errors of PDR.

Figure 8:
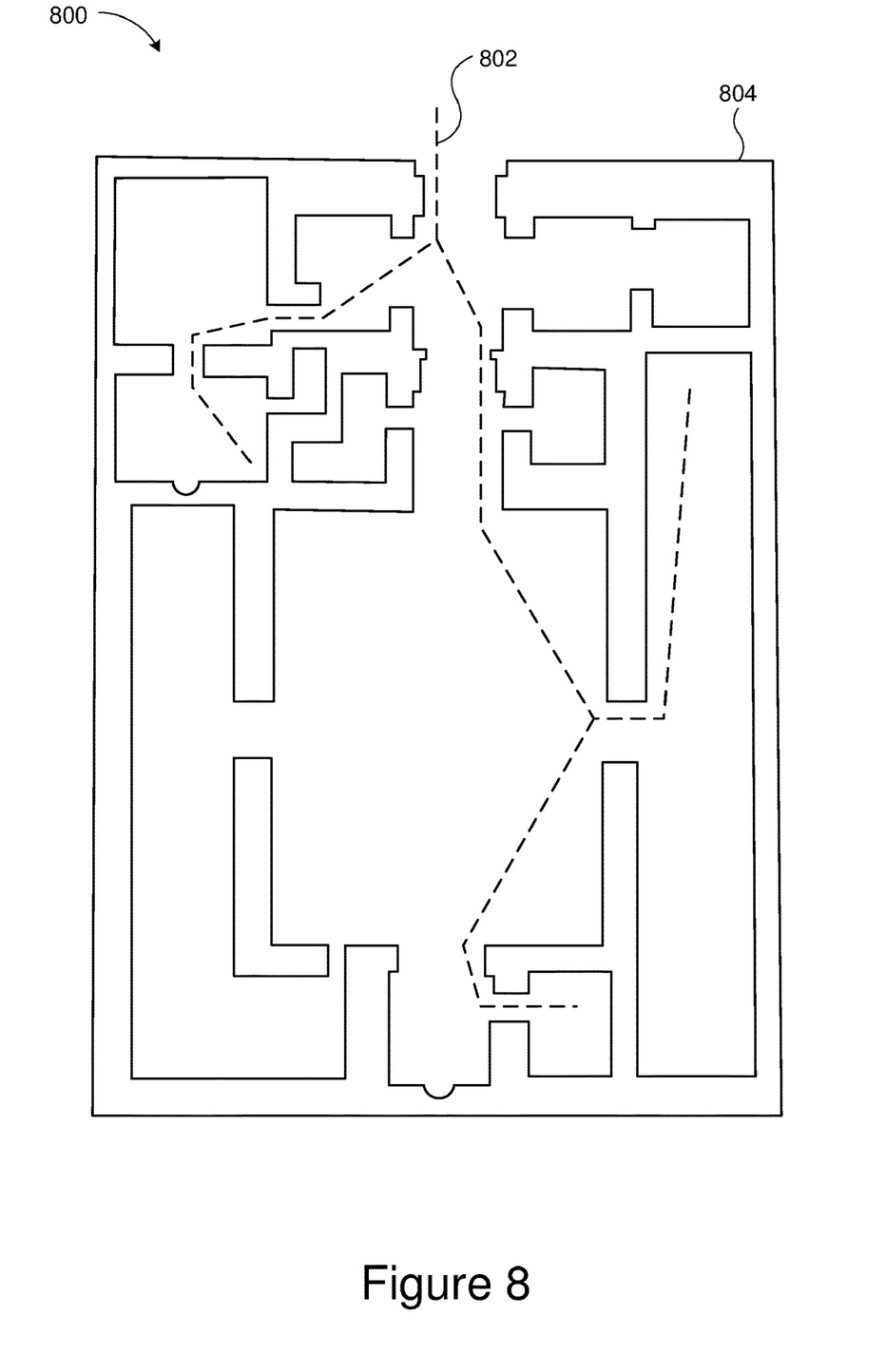
FIG. 8 illustrates an overhead view of a multi-rope digital pathway within a building, according to an embodiment.

FIG. 8 illustrates an overhead view 800 of a multi-rope path 802 within a building 804, according to one embodiment. As shown, building 704 and other structures can be complex. The system 600 allows for localization along a multi-rope path 802 regardless of complexity and size of the building 804 or other structure.

The illustrated embodiment is one example of an image that may be provided to a coordination display 608 or to individual navigation devices 606(A-C). In some embodiments, the building 804 may be shown as illustrated, with a wireframe layout showing rooms and hallways in a minimal layout. More or less information may be provided, such as satellite imagery, technical layouts (electrical, plumbing, etc.), and so forth. The ability to drill-down through layers or focus on a particular portion of the building 804 to gain access to more detail or different detail may also be incorporated. Additional information such as thermal imaging or other critical or supplemental data may be collected at each navigation device 606(A-C) to provide additional data.

Figure 9:
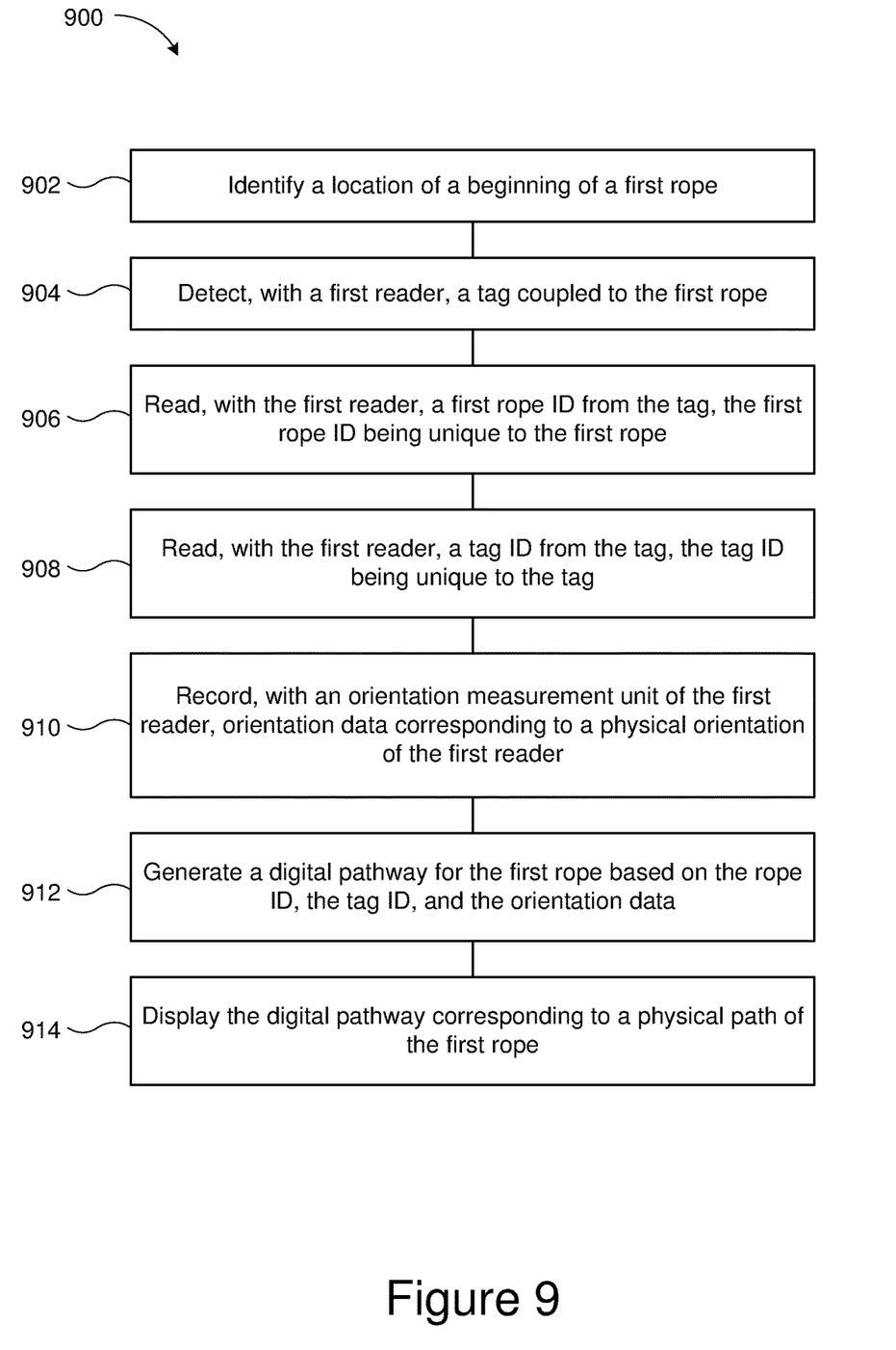
FIG. 9 illustrates a flow diagram of a method for rope-based localization, according to an embodiment.

FIG. 9 illustrates a flow diagram of a method 900 for rope-based localization, according to an embodiment. The method 600 provides for the generation of a digital pathway that can be imaged and used to locate rescuers based on information created as they proceed into a building or other structure.

The method 900 may include identifying a location of a beginning of a first rope (Block 902) or some tag at the middle of the rope. For example, the first rope may be positioned outside of a building and associated with a GPS or other location data obtainable outside of the building or any location where position is assigned or other structure prior to entering the structure at which point GPS and other location signals may be absent or otherwise insufficient.

The method 900 may include detecting, with a first reader, a tag coupled to the first rope (Block 904). For example, as a tag of the rope come into proximity of the reader, the reader may detect the tag. The tag may be a passive tag which is responsive to an input from the reader or may be an active tag which provides information to the reader in response to a prompt.

The method 900 may include reading, with the first reader, a first rope ID from the tag, the first rope ID being unique to the first rope (Block 906). For example, the identification data received from the tag by the reader may include a rope ID which may be the same for each tag on the rope but unique to the rope to distinguish the rope from other ropes.

The method 900 may include reading, with the first reader, a tag ID from the tag, the tag ID being unique to the tag (Block 908). For example, while the rope ID read by the reader may be uniform across all tags on the same rope, each tag may have a unique tag ID to assist in calculating a location of the reader based off the tag IDs read by the reader.

The method 900 may include recording, with an orientation measurement unit (OMU) of the first reader, first orientation data corresponding to a physical orientation of the first reader (Block 910). For example, the OMU of the reader may track angular displacement of the reader in the form of azimuth, and attitude, or elevation measurements. This may allow the reader to detect a trajectory of the reader and the user of the reader to provide more accurate localization.

The method 900 may include generating a digital pathway for the first rope based on the rope ID, the tag ID, and the orientation data (Block 912). For example, the rope ID may identify the rope, while the tag IDs provide distance information and the orientation data provide trajectory.

The method 900 may include displaying the digital pathway corresponding to a physical path of the first rope (Block 914). For example, with the information provided, the digital pathway may be created and displayed as an overlay or layer to a satellite image, wireframe, or other map to provide guidance to rescuers or other persons attempting to locate the user of the rope. This can provide critical localization speed during a fire, flood, rescue, or other situation which can improve the odds of avoiding harm or loss of life.

Elements of the method 900 may be executed in one or more ways such as by a human, including the subject, by a processing device such as the processor 306 or server 602, by mechanisms operating automatically or under human control such as the reader 106, and so forth.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and nonobvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system for rope-based localization, the system comprising:
    a rope;
    a first tag and a second tag coupled to the rope with the second tag being positioned at an interval from the first tag along a length of the rope; and
    a reader comprising:
        a reader tag sensor configured to:
            detect the first tag coupled to the rope as the reader comes into proximity of the first tag; and
            record identification data from the first tag, the identification data comprising at least one of a rope ID or a tag ID, wherein:
                the rope ID comprises identifying information unique to the rope; and
                the tag ID comprises identifying information unique to the first tag; and
        an orientation measurement unit configured to record orientation data based on an orientation of the reader, the orientation data comprising an azimuth measurement and an attitude measurement describing the orientation of the reader in response to an input at the reader;
    a navigation device comprising:
        a navigation tag sensor configured to detect the first tag coupled to the rope as the navigation device comes into proximity of the first tag; and
        a navigation processor configured to receive the positioning data of the first tag.

2. The system of claim 1, wherein the interval between the first tag and second tag and a third tag follows a pre-defined pattern along the length of the rope.

3. The system of claim 1, wherein the navigation device further comprises a display to display at least one of a position of the navigation device or an orientation of the navigation device.

4. The system of claim 1, wherein the reader further comprises a reader processor to calculate a digital pathway based on the identification data and orientation data collected by the reader.

5. The system of claim 1, further comprising a coordination display, separate from the navigation device, configured to:
    receive real-time information based on the data package from the apparatus; and
    display the digital pathway over a map.

6. The system of claim 1, further comprising a server to:
    communicate with at least one of the reader or the navigation device; and
    relay the digital pathway data.

7. The system of claim 1, wherein at least one of the reader or the navigation device further comprises an inertial measurement unit to record an additional digital pathway in response to a determination that the at least one of the reader or the navigation device is away from the rope.

8. An apparatus for rope-based localization, the apparatus comprising:
    a rope;
    a first tag and a second tag coupled to the rope with the second tag positioned at a corresponding interval from the first tag along a length of the rope; and
    a reader comprising:
        a tag sensor configured to detect the first tag coupled to the rope when the reader is in proximity of the first tag and configured to read identification data from the first tag; and
        an orientation measurement unit to detect orientation data based on an orientation of the reader, wherein the identification data and the orientation data are configured to generate a digital pathway.

9. The apparatus of claim 8, wherein the identification data comprises a rope ID unique to the rope and distinguishing the rope from another rope.

10. The apparatus of claim 8, wherein the identification data comprises a first tag ID corresponding to the first tag and distinguishing the first tag from the second tag, wherein the identification data further comprises a second tag ID corresponding to the second tag.

11. The apparatus of claim 10, wherein the first tag ID and the second tag ID can be used to determine a distance from a beginning of the rope or a travel direction along the rope.

12. The apparatus of claim 8, further comprising an anchor to attach the rope to a surface.

13. The apparatus of claim 12, wherein the anchor is a start anchor at a beginning of the rope, an intermediate anchor between a beginning and an end of a rope, a branch anchor configured to facilitate attachment of a second rope to the rope, or an end anchor at an end of the rope.

14. The apparatus of claim 8, wherein the reader is further configured to estimate a distance from the reader to at least one of the first tag or the second tag based on a received signal strength indicator associated with a corresponding one of the first tag or the second tag.

15. The apparatus of claim 8, wherein the reader is further configured to record an audio cue or a visual cue to be associated with at least one of the rope or the first tag, the audio cue or visual cue providing navigation information to supplement the identification data and the orientation data.

16. The apparatus of claim 8, further comprising a processor to calculate the digital pathway based on the identification data and the orientation data collected by the reader.

17. An apparatus for rope-based localization, the apparatus comprising:
    a rope;
    a first tag and a second tag coupled to the rope with the second tag positioned at a corresponding interval from the first tag along a length of the rope, wherein the first tag comprises a first tag ID and the second tag comprises a second tag ID, wherein the first tag ID and the second tag ID can be used to determine a travel direction along the rope; and
    a navigation device comprising:
        a tag sensor configured to detect the first tag coupled to the rope when the navigation device is in proximity of the first tag and configured to read identification data from the first tag, the identification data comprising the first tag ID; and
        an orientation measurement unit configured to detect orientation data based on an orientation of the navigation device; and
        a processor configured to determine a position of the navigation device relative to the rope based on the orientation data for the navigation device and identification data from at least one of the first tag or the second tag.

18. The apparatus of claim 17, wherein the navigation device further comprises a display device configured to display a location of the navigation device relative to the rope.

19. The apparatus of claim 18, wherein the display device is configured to provide a visual indication of the orientation of the navigation device.

20. The apparatus of claim 17, wherein an audio speaker is configured to provide the audio instructions to navigate along the rope.

\* \* \* \* \*